Figures 1, 2, 3:
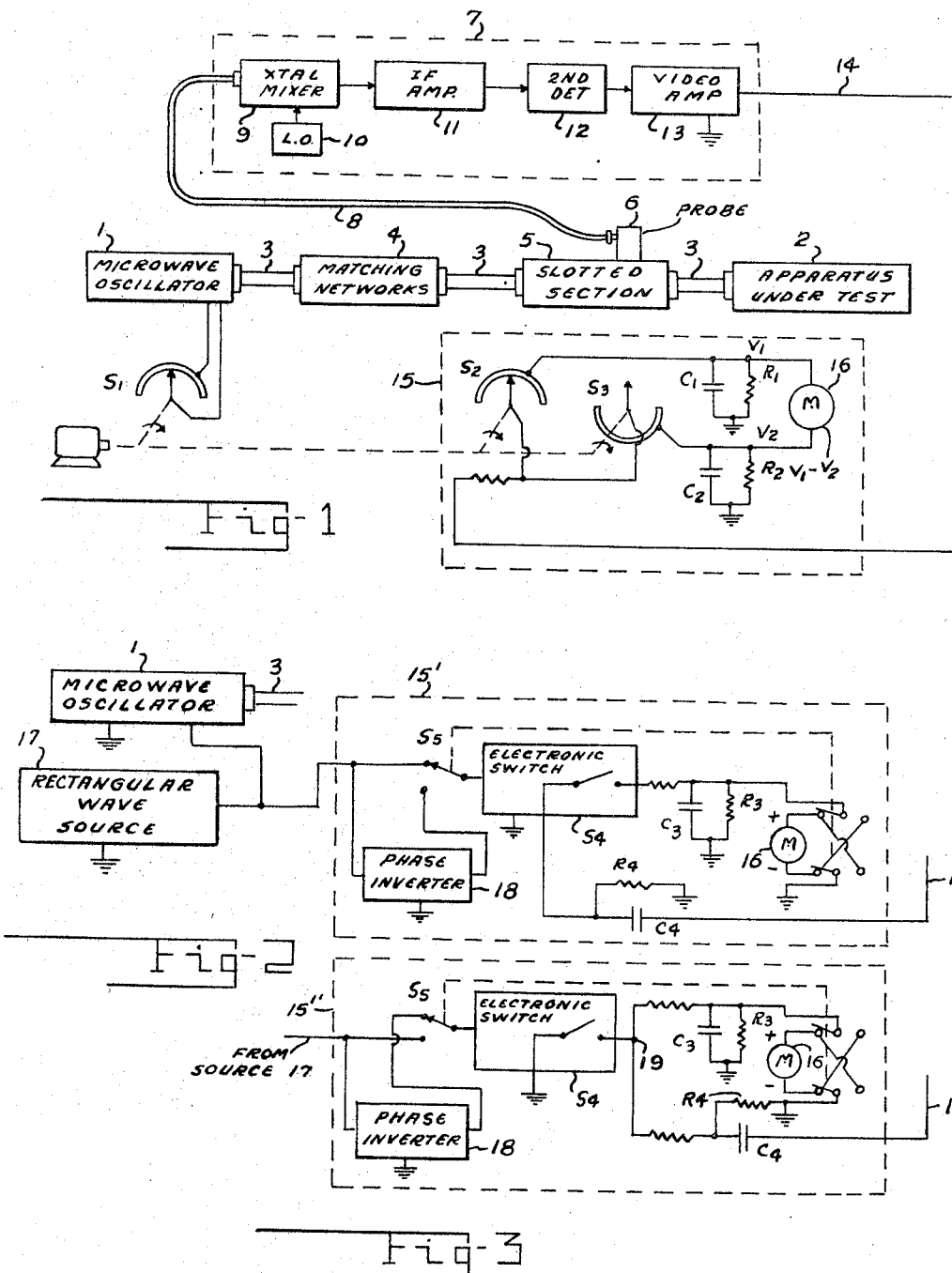

INVENTOR.
GEORGE N. OETZEL

INVENTOR.
GEORGE N. OETZEL

United States Patent Office
3,323,055
Patented May 30, 1967

3,323,055
APPARATUS FOR MEASURING THE AMPLITUDE OF A RECTANGULAR WAVE IN THE PRESENCE OF NOISE
George N. Oetzel, Palo Alto, Calif., assignor to the United States of America as represented by the Secretary of the Air Force
Filed Sept. 17, 1963, Ser. No. 309,583
1 Claim. (Cl. 324—111)

The purpose of this invention is to provide apparatus for measuring the amplitude of a rectangular wave in the presence of noise. It is particularly applicable to the measurement of rectangular waves in VSWR (voltage standing wave ratio) indicators but may be used in any situation where the rectangular wave frequency is available for switching purposes. The method generally in use for reducing the effects of noise in microwave VSWR measurements consists in applying a rectangular modulation of the on-off type to the microwave signal generator and using an amplifier tuned to the fundamental frequency of the modulation, for example 1000 c./s., to amplify the probe output signal. The disadvantage of this method in VSWR measurements is that the amplifier must have a relatively wide bandwidth of about 40 c./s., with a resulting loss in sensitivity, in order to avoid frequency stability problems. This disadvantage also applies to the general use of this method for measuring rectangular wave amplitudes, plus the disadvantage that the amplifier is fixed tuned to 1000 c./s. The apparatus in accordance with the invention is free from these disadvantages in that it can operate over a relatively wide range of frequencies and with a sensitivity improvement of 10 to 13 db giving an effective bandwidth of 2 to 4 c./s.

Briefly, in accordance with the invention, a switching arrangement synchronized with the rectangular wave is used in conjunction with either two integrating circuits or one integrating circuit to produce a voltage proportional to the true amplitude of the rectangular wave in the presence of noise. In the two integrating circuit method, the rectangular wave plus noise is switched alternately between the two integrating circuits at the occurrence of each edge of the rectangular wave. The difference between the voltages of the two integrating circuits, as indicated by a suitable meter, is proportional to true amplitude of the rectangular wave. In the one integrating circuit method, the direct current component is removed from the rectangular wave and either the positive portions or the negative portions of the resulting alternating current wave are applied to the integrating circuit by the switching arrangement. The average value of either of these portions, as derived by the integrating circuit, is proportional to the true value of the rectangular wave. When used in VSWR indicating apparatus these methods permit the use of a high gain superheterodyne radio receiver to amplify the R.F. output of the probe, thus increasing the sensitivity over the above-described method using an amplifier tuned to the modulating frequency.

Figure 4:
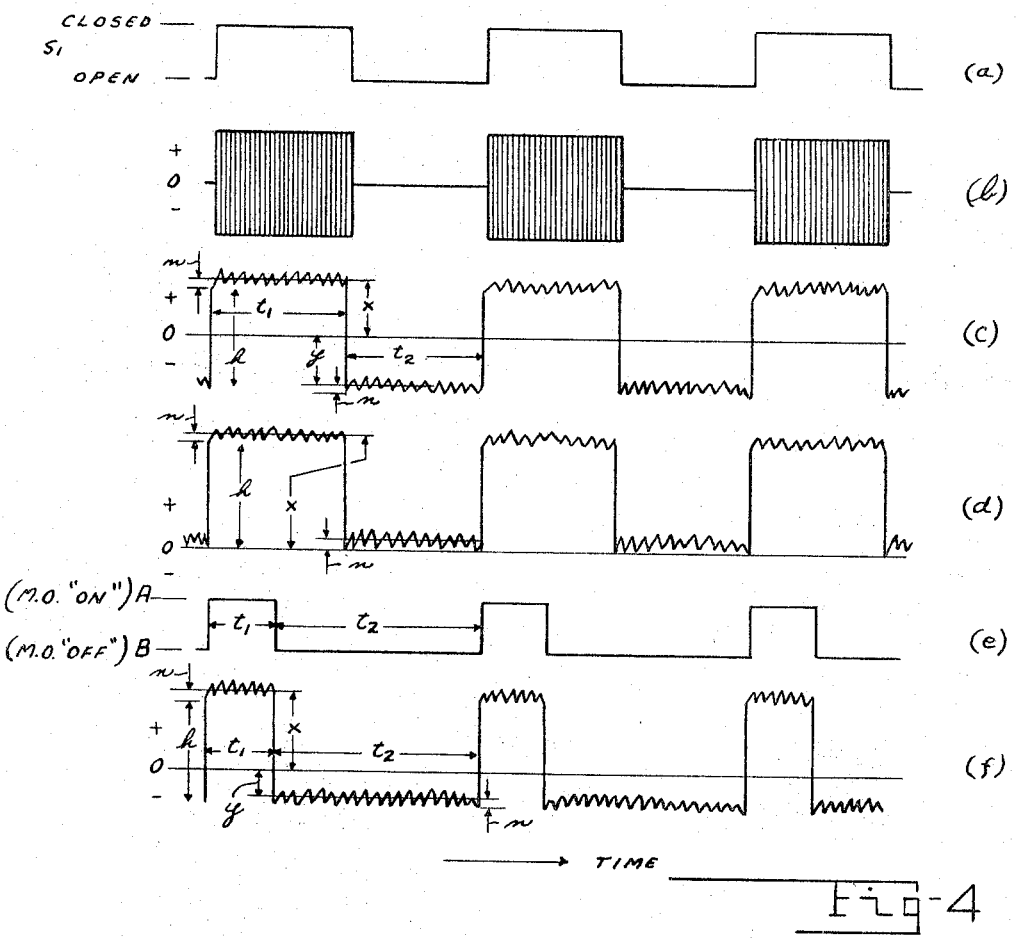

The invention will be explained in more detail with reference to the specific embodiments thereof shown in the accompanying drawings in which FIG. 1 illustrates the two integrating circuit embodiment of the invention as applied to VSWR indicating apparatus, FIG. 2 illustrates one form of the one integrating circuit method of the invention, FIG. 3 illustrates a second form of the one integrating circuit method, FIG. 4 gives waveforms illustrating the operation of the circuits of FIGS. 1, 2 and 3, and FIG. 5 illustrates a method of obtaining the switching waveforms directly from the rectangular wave to be measured.

Referring to FIG. 1, in which the invention is shown applied to VSWR measuring apparatus, the microwave oscillator 1, modulated as described later, provides high frequency energy to the apparatus 2 under test by way of suitable wave transmission means 3, such as a coaxial line or waveguide, matching networks 4 as required and a conventional slotted section of transmission line 5. Probe 6 is movable along the line and picks up microwave energy in proportion to the wave intensity at the particular point at which the probe is located. If apparatus 2 reflects some of the energy applied to it, a standing wave results in the transmission line. The maximum and minimum values of the standing wave may be determined by measuring the output of probe 6 as it is moved along the slotted section. The ratio of the maximum value to the minimum value is the VSWR from which certain electrical characteristics of apparatus 2 may be determined. High sensitivity is required in order to accurately measure very small minimum values of the standing wave which may occur with the low level of energization provided by oscillator 1. This is provided by super-heterodyne receiver 7 which receives the R.F. output of probe 6 over transmission line 8. The receiver comprises mixer 9, local oscillator 10, intermediate frequency amplifier 11, second detector 12 and video amplifier 13. The output of video amplifier 13 on line 14 is the modulation on the microwave energy in greatly amplified form. The amplitude of this modulation is proportional to the amplitude of the R.F. energy at probe 6. Therefore the VSWR may be determined by measuring the maximum and minimum values of the modulation as probe 6 is moved along the slotted section of line.

The microwave output of oscillator 1 receives a rectangular amplitude modulation of 50% duty cycle and 100% modulation factor due to the action of constant speed rotary switch $S_1$. The arrangement is such that when $S_1$ is closed oscillator 1 has an R.F. output and when open the output is zero. This is represented in FIG. 4 where graph (a) illustrates the operation of $S_1$ and graph (b) represents the output of oscillator 1. The manner in which the modulation is accomplished depends upon the type oscillator employed. For example, if a reflex klystron is used, the modulation may be achieved by a rectangular variation of the reflector voltage. The modulated R.F. picked up by probe 6 is amplified and demodulated in receiver 7 to produce, at its output 14, the rectangular modulation. A certain amount of noise also appears in the receiver output. The problem is to measure the amplitude of the rectangular wave in the presence of the noise.

Output wave forms for receiver 7 are shown at (c) and (d) in FIG. 4. If the direct current components of the rectangular wave and noise do not appear in the output of video amplifier 13, the waveform is as shown at (c). The average value of the noise is designated $n$ and the average values of the positive and negative half-cycles are designated $x$ and $y$, respectively. Since there is no net transfer of charge, $xt_1 = yt_2$, and, in the example shown, $x = y$ since $t_1 = t_2$. If the video amplifier has the direct current components of the rectangular wave and the noise in its output, the waveform may be as shown at (d), which is unipolar. In either case the problem is to find the amplitude of the rectangular wave $h$.

The output waveform of the receiver 7 is applied to detector 15 for measurement of the amplitude $h$. This detector comprises rotary switches $S_2$ and $S_3$ which are like $S_1$ and are driven in synchronism with $S_1$. $S_2$ is driven in phase with $S_1$, and $S_3$ is driven 180° out of phase with $S_1$. Therefore, when $S_1$ is closed, $S_2$ is closed and $S_3$ is open; whereas, when $S_1$ is open, $S_2$ is open and $S_3$ is closed. The receiver output is applied to the rotors of $S_2$ and $S_3$ in parallel. When the oscillator 1 is "on," the wave is applied through $S_2$ to integrating circuit $R_1C_1$; when the oscillator is "off" the wave is applied through $S_3$ to integrating circuit $R_2C_2$. Voltmeter 16 indicates the algebraic difference between the voltages $V_1$ and $V_2$ across the two integrating circuits. This difference is proportional to $h$, the true amplitude of the rectangular wave.

Considering the operation of detector 15 in more detail, if a bipolar wave such as shown in FIG. 4(c) is applied, $C_1$ charges positively during the time oscillator 1 is "on" ($S_1$ closed) to the average value $x$ of the positive half-cycle and $C_2$ charges negatively during the time oscillator 1 is "off" ($S_1$ open) to the average value $y$ of the negative half-cycle. Therefore $V_1$ is positive and equal to $x$ and $V_2$ is negative and equal to $y$. Consequently, the indication of meter 16, which is proportional to the algebraic difference $V_1-V_2$, is proportional to $x+y$. Therefore, the meter reading is proportional to $h$ since, as seen in FIG. 4(c), $$h=n+y+x-n=x+y$$

If the applied wave is unipolar, such as wave (d) in FIG. 4, $C_1$ charges to $x$ and $C_2$ to the average noise value $n$. Therefore the meter indication is proportional to $x-n$, which, as seen from waveform (d), is equal to $h$. The unipolar wave may have a direct current component in excess of that illustrated at (d) without altering the operation of the circuit.

Although the operation of detector 15 has been explained, in connection with symmetrical rectangular waveforms ($t_1=t_2$), the circuit will operate in the same manner with unsymmetrical rectangular waveforms ($t_1 \neq t_2$) such as illustrated at (f) in FIG. 4. With unsymmetrical waveforms, the sectors of $S_1$ and $S_2$ would be made to conform in angular extent to $t_1$ and the sector of $S_3$ to $t_2$. With regard to the manner of illustrating the switching in FIG. 1, the mechanical switches shown are merely intended to be symbolic of the switching functions required. These switching devices may take any suitable form. While mechanical switching is entirely feasible for the lower switching frequencies, in actual practice and especially at the high switching frequencies a suitable form of electronic switching would normally be used.

FIGS. 2 and 3 show in blocks 15' and 15" variations of detector 15 which use a single integrating circuit $R_3C_3$. While it is permissible in detector 15 of FIG. 1 for the applied waveform to have a direct current component, in detectors 15' and 15" the direct current component must be removed before application of the wave to the integrating circuit. Therefore, each detector is provided with a capacitor $C_4$ to block the direct current component. Consequently, the waveform appearing across $R_4$ in each case is of the type shown at (c) and (f) in FIG. 4. In FIGS. 2 and 3, rectangular wave modulation of the oscillator 1 and electronic switching are used instead of the mechanical switching devices illustrated in FIG. 1.

Referring to FIG. 2, the rectangular wave source generates a rectangular wave having two voltage levels A and B as shown at (e) in FIG. 4. This wave is applied as a modulating wave to oscillator 1, the arrangement being such that the oscillator has a microwave output, or is "on," at level A and has zero output, or is "off," at level B. This results in a rectangular voltage wave plus noise output from receiver 7 (FIG. 1) which may or may not have a direct current component, as explained for FIG. 1. In either case, due to the presence of blocking capacitor $C_4$, the waveform across $R_4$ contains the alternating components only and is of the type shown at (c) and (f) of FIG. 4. The problem is to determine $h$, the true amplitude of the rectangular wave.

The rectangular modulating wave from source 17 is also applied, with $S_5$ in the position shown, to electronic switch $S_4$ which is so designed as to be closed at level A of the wave and open at level B. Therefore, considering the general case of an unsymmetrical rectangular wave ($t_1 \neq t_2$) as illustrated at (f) in FIG. 4, during $t_1$ switch $S_4$ is closed and the positive portion of the wave is applied to integrating circuit $R_3C_3$, but during $t_2$ $S_4$ is open which prevents the application of the negative portion of the wave to the integrating circuit. Consequently, $C_3$ charges to the average value $x$ of the positive portion, which is indicated by meter 16. That $x$ and this indication are proportional to $h$ may be seen from the following:

(1) $$xt_1=yt_2$$

(2) $$h=n+y+x-n=x+y$$

from (2)

(3) $$y=h-x$$

substituting for $y$ in (1) and rearranging (4) $$x=\frac{t_2h}{t_1+t_2}$$

It is also possible to obtain an indication proportional to $h$ by measuring $y$, the average value of the negative portion of the wave. This is done by moving $S_5$ to its lower position which causes the rectangular modulating wave from source 17 to be reversed in phase by element 18 before application to electronic switch $S_4$, resulting in $S_4$ being open during $t_1$ and closed during $t_2$. Therefore, in this case, $C_3$ charges to a negative potential equal to the average value $y$, of the negative portion of the wave. Actuation of $S_5$ also reverses the polarity of meter 16 to accommodate the negative potential being measured. By a similar procedure to that given above for $x$ it is seen that (5) $$y=\frac{t_1h}{t_1+t_2}$$

The operation of FIG. 3 is similar in all respects to that of FIG. 2 except that the application of the undesired part of the wave to the integrating circuit $R_3C_3$ is prevented by using $S_4$ to ground point 19, which requires an $S_4$ phase opposite to that of $S_4$ in FIG. 2. This phase reversal is achieved by reversing the rectangular wave phases at the two poles of $S_5$.

It is apparent that $x$ and $y$ are not equal for an unsymmetrical rectangular wave, $x$ being greater when $t_1 < t_2$ and $y$ being greater when $t_1 > t_2$. Therefore, for an unsymmetrical wave, $S_5$ should be set to obtain the greater of the two readings if maximum sensitivity is desired.

Figure 5:
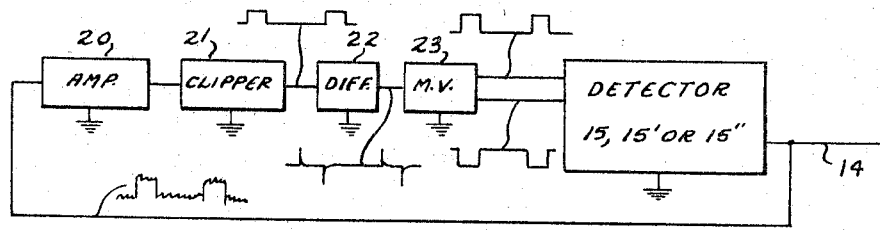

The rectangular wave measuring apparatus has been described in conjunction with VSWR measuring equipment where the signal generator modulation is available to control the detector switching. However, as stated earlier, it may be employed to measure rectangular waves in the presence of noise in any situation where it is possible to synchronize the detector switching with the positive-going and negative-going edges of the rectangular wave. FIG. 5 illustrates a method using conventional techniques for deriving the switching waveforms directly from the wave to be measured. Referring to this figure, the input wave to the detector on line 14 is also applied to the input of amplifier 20. Elements 20 and 21 amplify and clip the wave to steepen the wavefronts, if required, and remove the noise. The resulting wave is then differentiated by element 22 to produce sharp positive-going and negative-going pulses, coincident with the edges of the applied wave. These pulses are applied as trigger pulses to multivibrator 23 which produces two rectangular switching waves of opposite phases for the operation of switches $S_2$ and $S_3$ (in electronic form) in detector 15 or switch $S_4$ in detector 15' or 15". Any significant delay in the production of the switching waveforms may be compensated by an equal delay in applying the input wave to the detector.

I claim:

Apparatus for measuring the amplitude of a rectangular wave in the presence of noise, comprising: a pair of two-terminal integrating networks each having one terminal connected to a point of reference potential; a pair of bidirectional switching means; means for applying the rectangular wave to be measured between said point of reference potential and the other terminal of one of said integrating circuits through one of said switching means and between said point of reference potential and the other terminal of the other of said integrating means through the other of said switching means; means synchronized with said rectangular wave for alternately closing and opening each of said switching means coincidently with successive edges of said rectangular wave, with the operations of said switches oppositely phased; and a voltage responsive indicator connected between the said other terminals of the integrating circuits.

References Cited
UNITED STATES PATENTS

| | | | |
|---|---|---|---|
| 2,679,028 | 5/1954 | Otis | 324—111 |
| 2,939,067 | 5/1960 | Wouk | 324—119 X |
| 3,165,694 | 1/1965 | Young | 324—111 |

WALTER L. CARLSON, *Primary Examiner.*

J. J. MULROONEY, *Assistant Examiner.*